(12) United States Patent
Hiester

(10) Patent No.: US 10,233,840 B2
(45) Date of Patent: Mar. 19, 2019

(54) COMPRESSOR INJECTOR APPARATUS AND SYSTEM

(71) Applicant: United Technologies Corporation, Hartford, CT (US)

(72) Inventor: Paul Hiester, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 913 days.

(21) Appl. No.: 14/676,535

(22) Filed: Apr. 1, 2015

(65) Prior Publication Data

US 2015/0308341 A1 Oct. 29, 2015

Related U.S. Application Data

(60) Provisional application No. 61/984,248, filed on Apr. 25, 2014.

(51) Int. Cl.
*F02C 7/12* (2006.01)
*F02C 7/143* (2006.01)
*F01D 5/08* (2006.01)

(52) U.S. Cl.
CPC .............. *F02C 7/143* (2013.01); *F01D 5/082* (2013.01); *Y02T 50/676* (2013.01)

(58) Field of Classification Search
CPC ................. F02C 7/143; D01D 5/082

USPC .......................................................... 60/806
See application file for complete search history.

(56) References Cited

U.S. PATENT DOCUMENTS

| 2008/0044284 | A1* | 2/2008 | Alvanos | F01D 11/001 416/193 A |
| 2009/0010751 | A1* | 1/2009 | McCaffrey | F01D 5/081 415/116 |
| 2009/0175732 | A1* | 7/2009 | Glasspoole | F01D 5/3007 416/97 R |
| 2015/0275690 | A1* | 10/2015 | McCaffrey | F01D 5/081 416/1 |
| 2015/0354455 | A1* | 12/2015 | Suciu | F02C 3/04 60/782 |
| 2016/0003166 | A1* | 1/2016 | Mosley | F02C 7/18 416/95 |
| 2016/0290149 | A1* | 10/2016 | Hill | F01D 11/001 |
| 2016/0312615 | A1* | 10/2016 | Lyons | F01D 5/081 |

* cited by examiner

*Primary Examiner* — Jason Shanske
(74) *Attorney, Agent, or Firm* — Snell & Wilmer, L.L.P.

(57) ABSTRACT

Cooling systems for high pressure compressor systems are provided. The cooling systems may comprise tangential on board injectors ("TOBIs"). The TOBIs may comprise one or more fluid channels configured to conduct cooling fluid flow to components of the compressor, including, for example, disk-hub portions of the compressor. In this regard, the TOBI may be configured to exhaust cooling air in a manner such that the exhausted air has a similar linear velocity of the disk-hub portion. The cooling air may also be exhausted in a manner that is substantially parallel to the disk-hub portion.

19 Claims, 5 Drawing Sheets

COMPRESSOR INJECTOR APPARATUS AND SYSTEM

CROSS-REFERENCE TO RELATED APPLICATIONS

This application is a nonprovisional of, and claims priority to, and the benefit of U.S. Provisional Application No. 61/984,248, entitled "COMPRESSOR INJECTOR APPARATUS AND SYSTEM," filed on Apr. 25, 2014, which is hereby incorporated by reference in its entirety.

FIELD

The present disclosure relates to gas turbine engine cooling systems, and more particularly, to compressor cooling systems comprising tangential on board injectors ("TOBIs").

BACKGROUND

Modern turbofan engines have a modular design architecture consisting of the "cold section" and "hot section." Air drawn into the engine undergoes an increase in pressure through the cold section, followed by a decrease in pressure through the hot section, as work is extracted from the compressed air. Typically, the air temperature increases through each stage of the engine. These elevated temperatures may go beyond the current temperature limits of hub materials. To enhance the effectiveness of the cooling air on the rotating components, TOBIs may be employed.

SUMMARY

In various embodiments, a compressor may comprise a disk-hub, a stator portion, a rotor portion, an exit guide vane and a TOBI. The rotor portion may be coupled to the disk hub. The rotor portion may also be adjacent to and aft the stator. The exit guide vane may be adjacent to and aft the rotor portion. The TOBI may be disposed radially inward of the exit guide vane and the rotor portion. The TOBI may be configured to conduct a cooling flow to a section of the disk hub adjacent the stator.

In various embodiments, the rotor portion may be coupled to the disk-hub by a blade attachment.

In various embodiments, the blade attachment may define a fluid conduit.

In various embodiments, the TOBI may include a first channel defined within a portion of a first root of the exit guide vane and a second channel defined within a portion of a second root of the rotor portion.

In various embodiments, the first channel and the second channel may be in fluid communication.

In various embodiments, the first channel may be operatively coupled to the second channel via the fluid conduit.

In various embodiments, a first pressure ($P_A$) is the first channel may be substantially equivalent to a second pressure ($P_E$) adjacent and aft the exit guide vane.

In various embodiments, a third pressure ($P_{C2}$) in the second channel may be substantially equivalent to a fourth pressure ($P_{C1}$) that is in a section between the stator blade and the rotor portion.

In various embodiments, $P_A$ may be substantially higher than $P_{C1}$ and $P_{C2}$.

In various embodiments, the velocity of the fluid exhausting the second channel may be substantially equivalent to the liner velocity of the disk-hub.

In various embodiments, a gas turbine engine may comprise a combustor, a turbine, and a compressor. The turbine may be in fluid communication with and configured to be driven by the combustor. The compressor may be in fluid communication with and configured to supply air to the combustor. The compressor may comprise a disk-hub, a rotor portion, an exit guide vane and a TOBI. The rotor portion may be coupled to the disk hub via a disk attachment. The exit guide vane may be adjacent to and aft the rotor. The TOBI may be disposed radially inward of the exit guide vane and the rotor. The TOBI may be configured to conduct a cooling flow to a first section of the disk hub forward of the rotor. The cooling flow may be exhausted from the TOBI at an angle that is substantially parallel and in a direction corresponding to the rotational motion of the disk-hub.

In various embodiments, the TOBI may comprise a first channel and a third channel in fluid communication with the first section via a fluid conduit in the disk attachment. The first channel and the second channel may be isolated from a second section.

In various embodiments, the second section may be defined between the rotor and the exit guide vane.

In various embodiments, the TOBI may comprise a second channel in fluid communication with a second section.

In various embodiments, the second section may be isolated from the first channel and the third channel by a seal.

In various embodiments, TOBI system may comprise a first channel and a second channel. The first channel may be defined in a root of an exit guide vane. The second channel may be defined in a root of a rotor portion. The second channel may be in fluid communication with the first channel. The second channel may be configured to exhaust a cooling flow to a first section forward of rotor portion in a direction that is substantially parallel to the direction of motion of a disk-hub.

In various embodiments, a first pressure in the first channel may be substantially higher than a second pressure in the second channel.

In various embodiments, the first channel and the second channel may be isolated from a second section defined between the rotor portion and the exit guide vane.

In various embodiments, a TOBI system may also comprise a third channel defined in the root of the exit guide vane. The third channel may be in fluid communication with a second section. The second section may be defined between the rotor portion and the exit guide vane.

In various embodiments, the third channel may be configured to conduct a cooling flow to a portion of the disk-hub associated with the second section.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
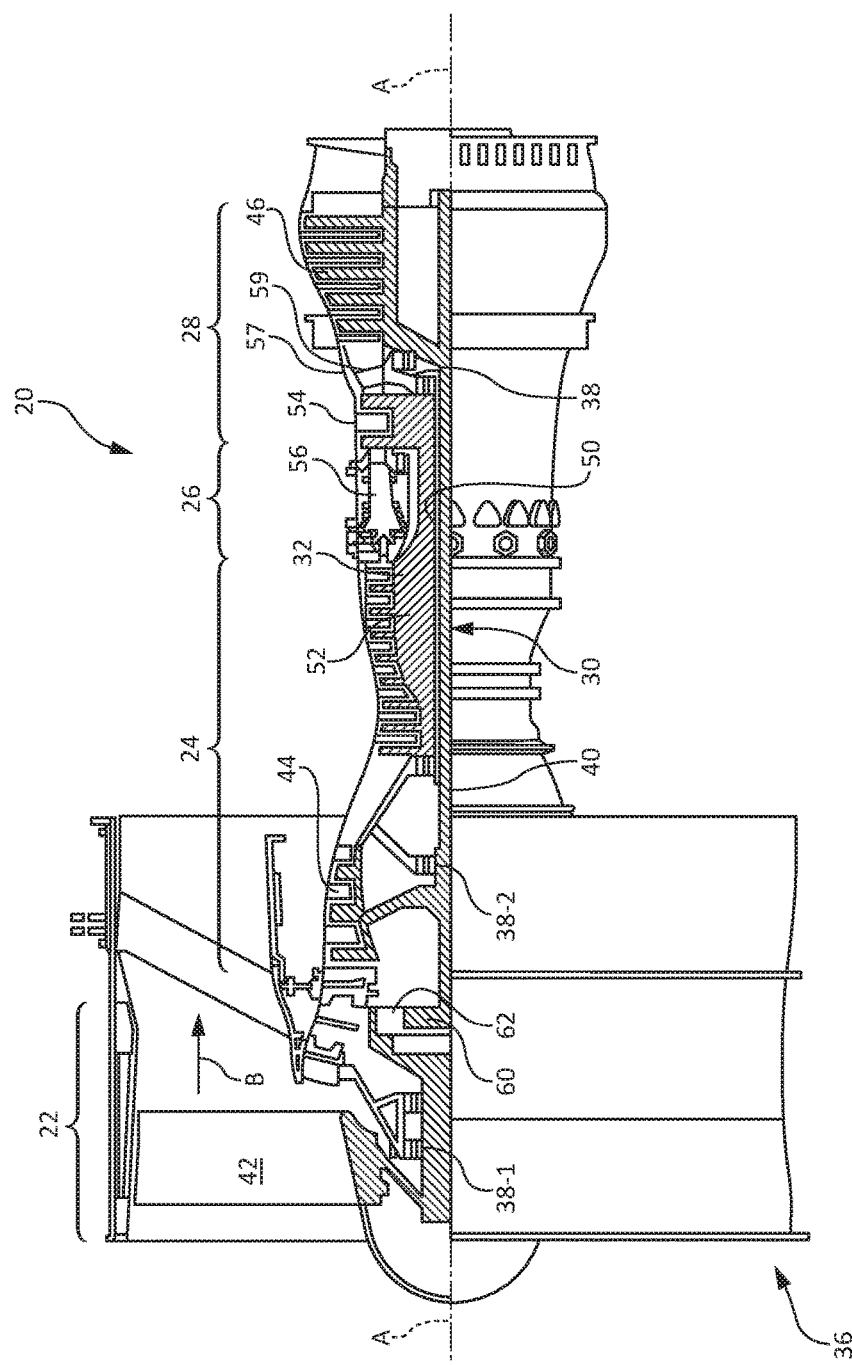
FIG. 1 illustrates cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 1). It should be understood that various bearing systems 38 at various locations may alternatively or additionally be provided including, for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about 5:1. Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which requires higher pressure ratios and higher temperatures in the HPC 52. These higher operating temperatures and pressure ratios may create operating environments that may cause thermal loads that are higher than the thermal loads which may shorten the endurance life of current components.

Figure 2:
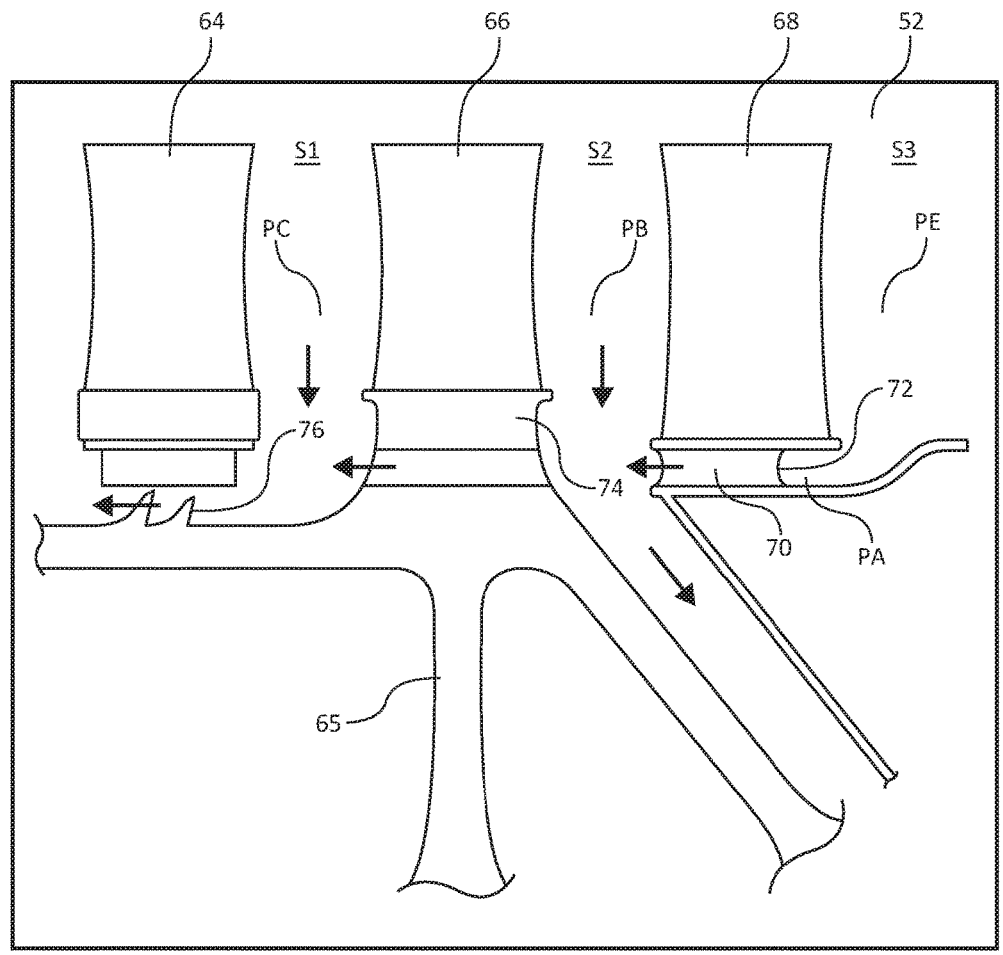
FIG. 2 schematically illustrates a prior-art cross-sectional view of a portion of a compressor comprising TOBI.

In various embodiments, and with reference to FIG. 2, typical HPCs 52 may comprise a stator portion 64, a rotor portion 66, and one or more exit guide vanes 68. Stator portion 64 may be configured to straighten air conducted along the gas path. Rotor portion 66 (e.g., a rotor disk comprising a plurality of rotor blades, a portion of a rotor disk including one or more rotor blades, a rotor blade, and/or the like) may be configured to spin or work the air conducted along the gas path. Exit guide vane 68 may be configured to straighten and/or condition the air along the gas path to prepare the air for introduction into the combustor. As overall engine pressure ratios continue to increase, the temperature of air leaving HPC 52 continues to increase. Typical systems have begun to employ cooling structures and/or systems, including, for example, TOBI 70. TOBI 70 may be configured to spin air to a velocity that closely matches and/or is substantially the same as the linear velocity of a rotating component (e.g., disk-hub structure 65), thereby reducing the temperature that the rotating component feels. In this regard, by spinning the air the TOBI 70 reduces the friction between the rotating component and the straightened air.

In various embodiments, TOBI 70 may comprise a first channel 72 and a second channel 74. In operation, a significant pressure ratio is required to impart the required velocity to the cooling air conducted through TOBI 70 along first channel 72 and/or second channel 74. At the rear stages of HPC 52, typically TOBI 70 may not be particularly effective due to the lack of available pressure ratio. In this regard, pressure $P_E$ at the exit guide vane is substantially equivalent to pressure $P_B$ and/or pressure $P_C$ between rotor portion 66 and exit guide vane 68 in region S2 and/or between stator portion 64 and rotor portion 66 in region S1 respectively.

In various embodiments, and with reference to FIG. 3, increasing the overall available pressure ratio for TOBI 80 may increase the effectiveness of the cooling provided by TOBI 80. HPC 52 may comprise stator portion 64, rotor portion 66, and exit guide vane 68. Moreover, HPC 52 may be configured with a TOBI 80. TOBI 80 may comprise a first channel 82, a fluid conduit 85, and a second channel 86. First channel 82 may be disposed radially inward and/or below exit guide vane 68. In this regard, first channel 82 may be disposed in the root of exit guide vane 68. First channel 82 may also be in fluid communication with section S3 (e.g., the section aft exit guide vane 68). In this regard, the pressure $P_A$ in first channel 82 may be substantially equivalent to the pressure aft the exit guide vane $P_E$ in section S3 of HPC 52. Fluid (e.g., air) may be conducted through first channel 82 to fluid conduit 85 and into second channel 86. Second channel 86 may be configured to and/or capable of exhausting the fluid flow F into section S1. Section S1 may be the area, and/or volume between stator portion 64 and rotor portion 66. The pressure $P_{C1}$ in section S1 may be substantially equivalent to the pressure $P_{C2}$ in second channel 86. Moreover, pressure $P_{C1}$ and/or $P_{C2}$ may be substantially less than pressure $P_E$ and/or pressure $P_A$. In this regard, the difference and/or increased pressure ratio (e.g., $P_E$ being greater than $P_{C1}$) may improve the overall performance of TOBI 80.

In various embodiments, fluid conduit 85 may be defined in and may be configured to allow fluid flow F to flow through blade retaining clip 84. Moreover, blade retaining clip 84 and the root structure of exit guide vane 68 may be configured to house, support, and/or otherwise comprise a seal 83. Seal 83 may be configured to isolate first channel 82, fluid conduit 85, and/or second channel 86 from section S2 (e.g., the section between rotor portion 66 and exit guide vane 68) and the associated pressure $P_B$. In this regard, seal 83 and/or blade retaining clip 84 may be configured to isolate fluid flow F and its associated pressure $P_E$ and/or $P_A$ from pressure $P_B$ associated with section S2, creating a greater overall pressure ratio for TOBI 80. This overall pressure ratio may increase the velocity of flow F conducted through first channel 82, fluid conduit 85 and/or second channel 86.

Figure 3A:
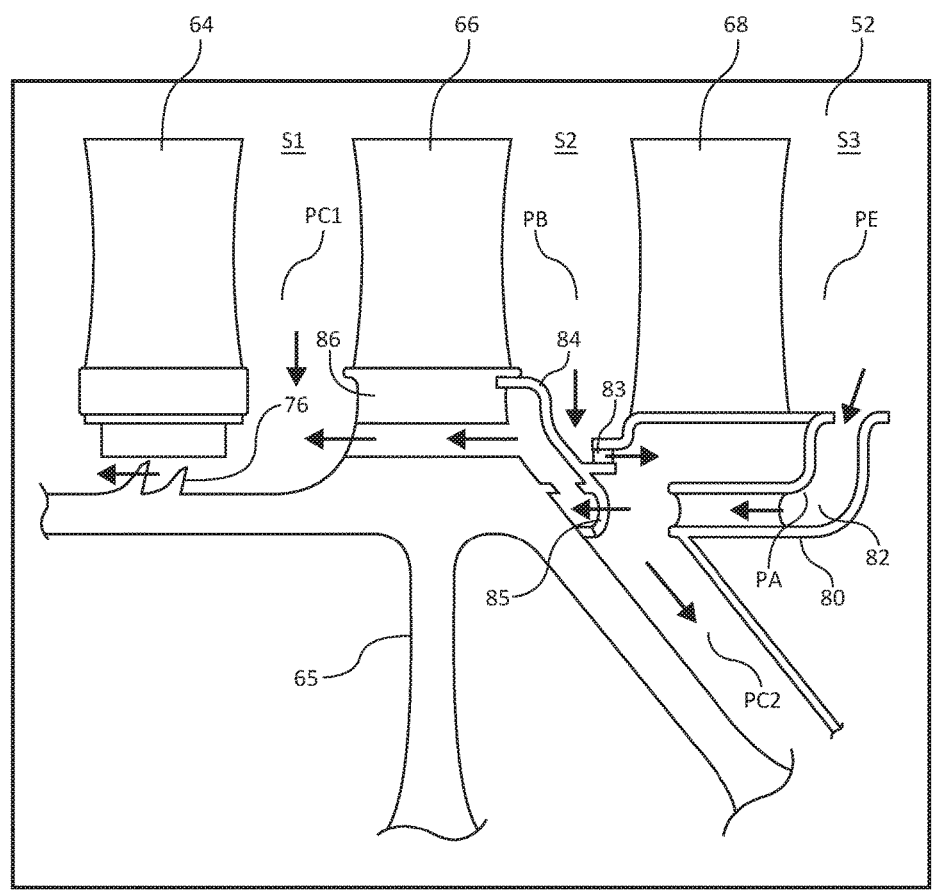
FIG. 3A schematically illustrates a cross-sectional view of a portion of a compressor including a sealed TOBI, in accordance with various embodiments.
Figure 3B:
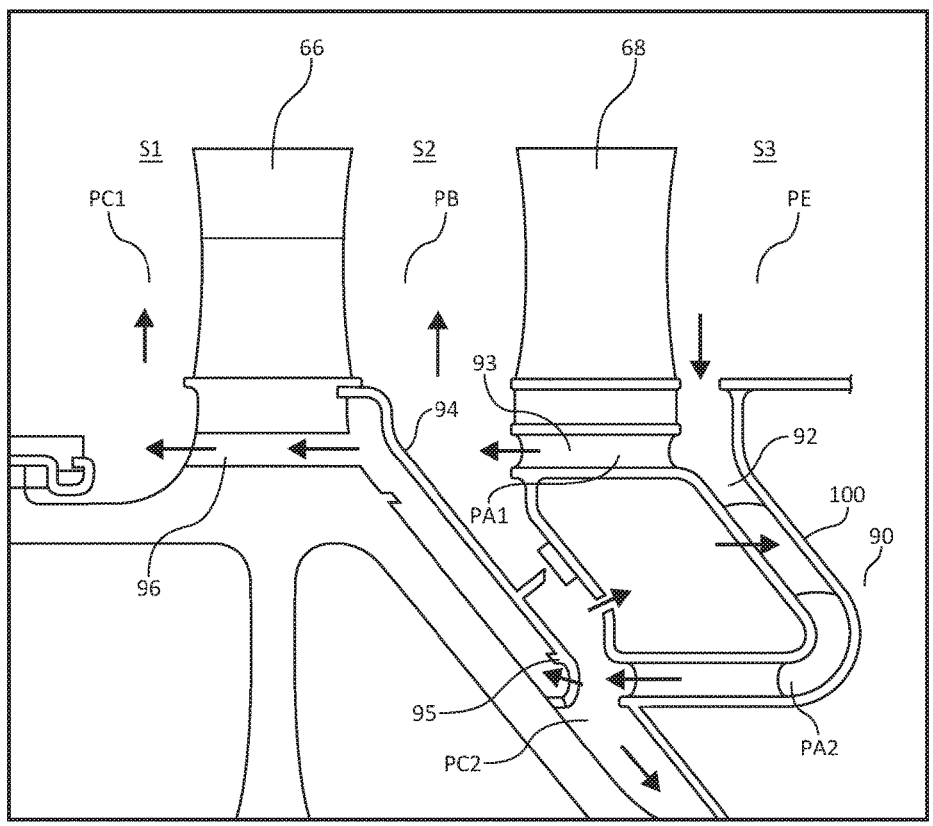
FIG. 3B schematically illustrates a top cross-sectional view of a portion of a TOBI, in accordance with various embodiments.
Figure 4:
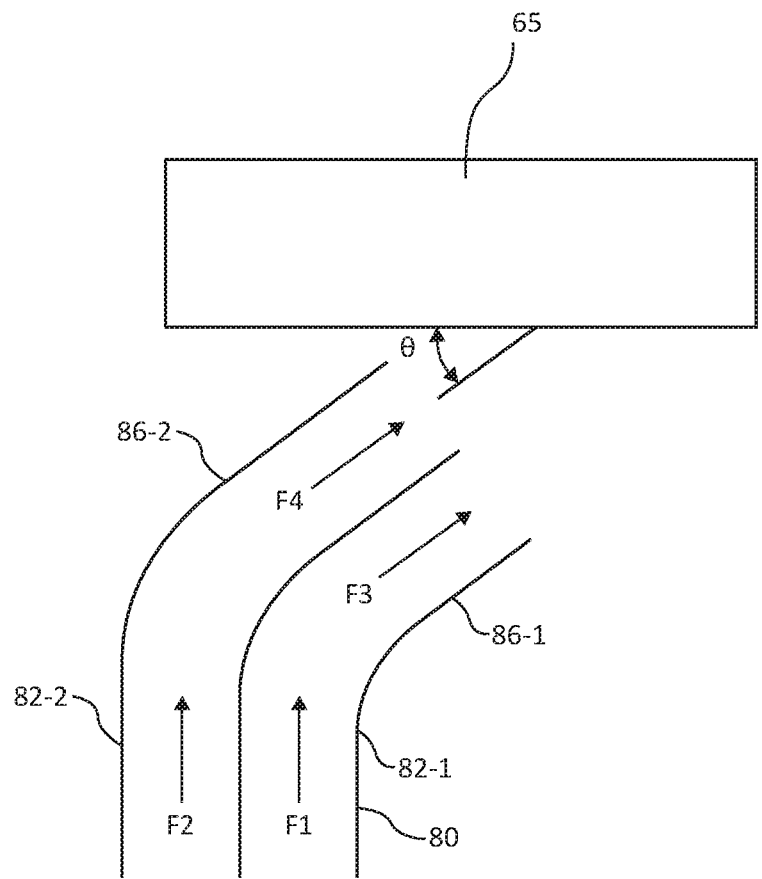
FIG. 4 schematically illustrates a cross-sectional view of a portion of a compressor including a dual sealed TOBI, in accordance with various embodiments.

In various embodiments, and with momentary reference to FIG. 3A and FIG. 3B FIG. 4, TOBI 80 may comprise one or more first channels 82 (e.g., first channel 82-1 and first channel 82-2), one or more fluid conduits 85, and one or more second channels 86 (e.g., second channel 86-1 and second channel 86). TOBI 80 may be configured to condition flow, F in the plurality of channels. For example, TOBI 80 may comprise a first channel 82-1 and a first channel 82-2. First channel 82-1 may be operatively coupled to and/or in fluid communication with second channel 86-1. Similarly, first channel 82-2 may be in fluid communication with and/or operatively coupled to second channel 86-2. Moreover, first channel 82-1 may be configured to conduct a flow F1 to second channel 86-1 and condition flow F1 to flow F3. Similarly, first channel 82-2 may be configured to conduct and condition a flow F2 to second channel 86-2, creating a flow F4. Flow F3 and flow F4 may exit second channel 86-1 and second channel 86-2, respectively, at an angle θ relative to disk-hub structure 65.

Angle θ may be any suitable range between approximately 0 and approximately 30 degrees. In one example, angle θ may be approximately 15 degrees. In a second example, θ may be less than 15 degrees.

Moreover, by decreasing the size of θ, the friction between flows F3 and F4 and disk-hub structure 65 may be reduced. In this regard, flow F3 and flow F4 may be substantially parallel to disk-hub structure 65. Moreover, the flow F3 and flow F4 may be exhausted from second channel 86-1 and second channel 86-2 at a velocity and angle such that they substantially match the rotation motion of disk-hub structure 65. In this regard, the tangential velocity and directional flow of flow F3 and flow F4 may be substantially consistent with the air and/or rotational movement of disk-hub structure 65, creating, reducing, minimizing, and/or limiting the amount of friction between flow F3 and flow F4 and disk-hub structure 65. Moreover, flow F3 and flow F4 may configured to accelerate and/or rotate the air near disk-hub structure 65 limiting and/or reducing the relative friction between the air discharge from stator portion 64 and disk-hub structure 65.

Returning momentarily to FIG. 3A, in various embodiments, stator portion 64 may have a sealed root. In this regard, fluid flow F through first channel 82, fluid conduit 85, and/or second channel 86 may be contained by a knife edge seal 76 at the root of stator portion 64. Stator portion 64 may seal against disk-hub structure 65 at knife edge seal 76, containing fluid flow F, and/or limiting fluid flow F into section S1 as fluid flow F is exhausted from second channel 86.

In various embodiments, and with reference to FIG. 3B, HPC 52 may comprise a dual TOBI system 90. Dual TOBI system 90 may comprise a first channel 92 that is in fluid communication with section S1 (e.g., the section forward of rotor portion 66). First channel 92 may be disposed in the root of exit guide vane 68. Dual TOBI system 90 may also comprise a second channel 93. Second channel 93 may be disposed in the root of exit guide vane 68. Second channel 93 may be configured to conduct a first fluid flow at a pressure $P_{A1}$ to section S2 (e.g., the section between rotor portion 66 and exit guide vane 68). Section S2 may have a pressure $P_B$. The pressure $P_B$ may be less than pressure $P_{A1}$, but substantially similar to $P_{A1}$ (e.g., $P_B$ may be approximately 95% of $P_{A1}$) limiting the cooling effectiveness of the cooling flow exhausted to section S2.

In various embodiments, first channel 92 of dual TOBI system 90 may be configured to conduct a fluid flow F6 to a fluid conduit 95 through blade retaining clip 94. Fluid conduit 95 may be in fluid communication with third channel 96. Third channel 96 may be configured to conduct fluid flow F6 into section S1. The pressure $P_{C1}$ in section S1 may be substantially equivalent to pressure $P_{C2}$ which is present at fluid conduit 95 and third channel 96. Moreover, first channel 92 may be isolated and/or sealed from section S2 and/or pressure $P_B$ by seal 97. Seal 97 may seal first channel 92 and create and/or allow pressure $P_{C1}$ and/or $P_{C2}$ to pressurize third channel 96 and the area defined by blade retaining clip 94.

In various embodiments, the pressure $P_{A1}$ may be substantially higher than $P_{C1}$ and/or $P_{C2}$ creating a higher exhaust velocity of the fluid exhausted from third channel 96. The higher exit velocity may improve the cooling effectiveness of the cooling flow. Moreover, the cooling flow may be conditioned as discussed herein. In this regard, the cooling flow may be discharged from third channel 96 at an angle that is substantially parallel to disk-hub structure 65. Moreover, the flow discharged from third channel 96 may be at a velocity that is substantially equivalent to the linear velocity of disk-hub structure 65.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A compressor, comprising:
   a disk-hub;
   a stator portion;
   a rotor portion coupled to the disk-hub, the rotor portion adjacent to and aft the stator portion;
   an exit guide vane adjacent to and aft the rotor portion;
   a tangential on-board injector ("TOBI") disposed radially inward of the exit guide vane and the rotor portion, wherein the TOBI is configured to conduct a cooling flow to a section of the disk-hub adjacent the stator portion, the cooling flow isolated from a section between the rotor portion and exit guide vane by a seal.

2. The compressor of claim 1, wherein the rotor portion is coupled to the disk-hub by a blade attachment.

3. The compressor of claim 2, wherein the blade attachment defines a fluid conduit.

4. The compressor of claim 3, wherein the TOM includes a first channel defined within a portion of a root of the exit guide vane and a second channel defined within a portion of a root of the rotor portion.

5. The compressor of claim 4, wherein the first channel and the second channel are in fluid communication.

6. The compressor of claim 4, wherein the first channel is operatively coupled to the second channel via the fluid conduit.

7. The compressor of claim 4, wherein a first pressure ($P_A$) in the first channel is equivalent to a second pressure ($P_E$) adjacent and aft the exit guide vane.

8. The compressor of claim 7, wherein a third pressure ($P_{C2}$) in the second channel is equivalent to a fourth pressure ($P_{C1}$) that is in a section between the stator portion and the rotor portion.

9. The compressor of claim 8, wherein $P_A$ is higher than $P_{C1}$ and $P_{C2}$.

10. The compressor of claim 9, wherein a velocity of the fluid exhausting the second channel is equivalent to the linear velocity of the disk-hub.

11. A gas turbine engine, comprising:
    a combustor;
    a turbine in fluid communication with and configured to be driven by the combustor; and a compressor in fluid communication with and configured to supply air to the combustor, the compressor comprising:
a disk-hub;
a rotor portion coupled to the disk-hub via a disk attachment;
an exit guide vane adjacent to and aft the rotor portion;
a tangential on-board injector ("TOBI") disposed radially inward of the exit guide vane and the rotor portion and configured to conduct a cooling flow to a first section of the disk-hub forward of the rotor portion through a first channel and a second channel, wherein the cooling flow is exhausted from the TOBI through an outlet of the second channel at an acute angle relative to the disk-hub.

12. The gas turbine engine of claim 11, wherein the first channel and the second channel are in fluid communication with the first section via a fluid conduit in the disk attachment, and wherein the first channel and the second channel are isolated from a second section.

13. The gas turbine engine of claim 12, wherein the second section is defined between the rotor portion and the exit guide vane.

14. The gas turbine engine of claim 13, wherein the second section is isolated from the first channel and the second channel by a seal.

15. A tangential on-board injector ("TOBI") system, comprising:
a first channel defined in a root of an exit guide vane;
a second channel defined in a root of a rotor portion, the second channel in fluid communication with the first channel, the second channel configured to exhaust a cooling flow to a first section forward of rotor portion through a second channel outlet at an acute angle relative to a disk-hub.

16. The TOBI system of claim 15, wherein a first pressure in the first channel is higher than a second pressure in the second channel.

17. The TOBI system of claim 15, wherein the first channel and the second channel are isolated from a second section defined between the rotor portion and the exit guide vane.

18. The TOBI system of claim 15, further comprising a third channel defined in the root of the exit guide vane, the third channel in fluid communication with a second section, wherein the second section is defined between the rotor portion and the exit guide vane.

19. The TOBI system of claim 18, wherein the third channel is configured to conduct a cooling flow to a portion of the disk-hub associated with the second section.

* * * * *